United States Patent
Vigour et al.

(10) Patent No.: US 8,822,007 B2
(45) Date of Patent: Sep. 2, 2014

(54) DECORATIVE ELEMENT, DASHBOARD, AND METHOD FOR MANUFACTURING A DECORATIVE ELEMENT

(75) Inventors: Jean-Pierre Vigour, Saint Ouen l'Aumone (FR); Frederic Guillauminaud, Cergy le Haut (FR)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/574,616

(22) PCT Filed: Nov. 4, 2010

(86) PCT No.: PCT/EP2010/006709
§ 371 (c)(1),
(2), (4) Date: Nov. 15, 2012

(87) PCT Pub. No.: WO2011/088858
PCT Pub. Date: Jul. 28, 2011

(65) Prior Publication Data
US 2013/0059108 A1    Mar. 7, 2013

(30) Foreign Application Priority Data
Jan. 23, 2010  (DE) .......................... 10 2010 005 496

(51) Int. Cl.
*B32B 5/00*  (2006.01)
*B32B 7/00*  (2006.01)
*B60R 13/00* (2006.01)
*B60K 37/02* (2006.01)

(52) U.S. Cl.
CPC ........... *B60K 37/02* (2013.01); *B60K 2350/402* (2013.01); *B60Y 2410/125* (2013.01)
USPC ................ 428/98; 428/31; 293/128; 293/155

(58) Field of Classification Search
None
See application file for complete search history.

(56) References Cited

U.S. PATENT DOCUMENTS

| 2,686,756 | A  | * | 8/1954  | Dow et al. ..................... 205/286 |
| 4,548,843 | A  |   | 10/1985 | Kozuka et al. |
| 5,532,045 | A  | * | 7/1996  | Wade ............................ 428/187 |
| 6,066,225 | A  |   | 5/2000  | Lopes |
| 6,279,974 | B1 |   | 8/2001  | McCormack |

FOREIGN PATENT DOCUMENTS

| DE | 2930769 A1   |   | 1/1981 |           |
| EP | 0386986 A1   |   | 9/1990 |           |
| EP | 0598706 A1   |   | 5/1994 |           |
| JP | 2006-194636  | * | 7/2006 | ............. G01D 11/28 |
| JP | 2007-147296  | * | 6/2007 | ............. G01D 13/04 |

OTHER PUBLICATIONS

International Preliminary Report on Patentability mailed Aug. 7, 2012.
International Search Report for application No. PCT/EP2010/006709 mailed Mar. 14, 2011.
Japanese Office Action dated Feb. 12, 2014.

\* cited by examiner

*Primary Examiner* — David Sample
*Assistant Examiner* — Nicole T Gugliotta
(74) *Attorney, Agent, or Firm* — Fletcher Yoder, P.C.

(57) ABSTRACT

The invention relates to a decorative element, to a dashboard of a motor vehicle, and to a method for manufacturing said decorative element, wherein the decorative element includes a first portion and a second portion, the first portion of the decorative element being made of a first non-transparent material, wherein said first material has a decoration layer, and the second portion of the decorative element being made of a second transparent material, the first portion and the second portion of the decorative member being unitary.

8 Claims, 2 Drawing Sheets

Figure 4:
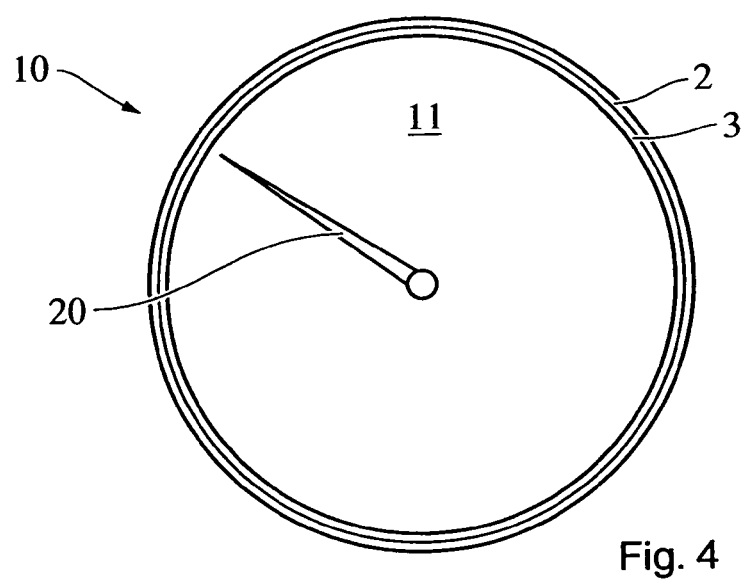

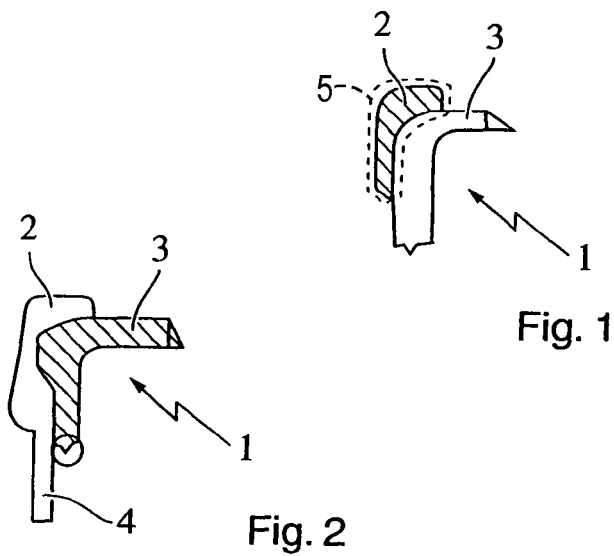
Fig. 1
Fig. 2
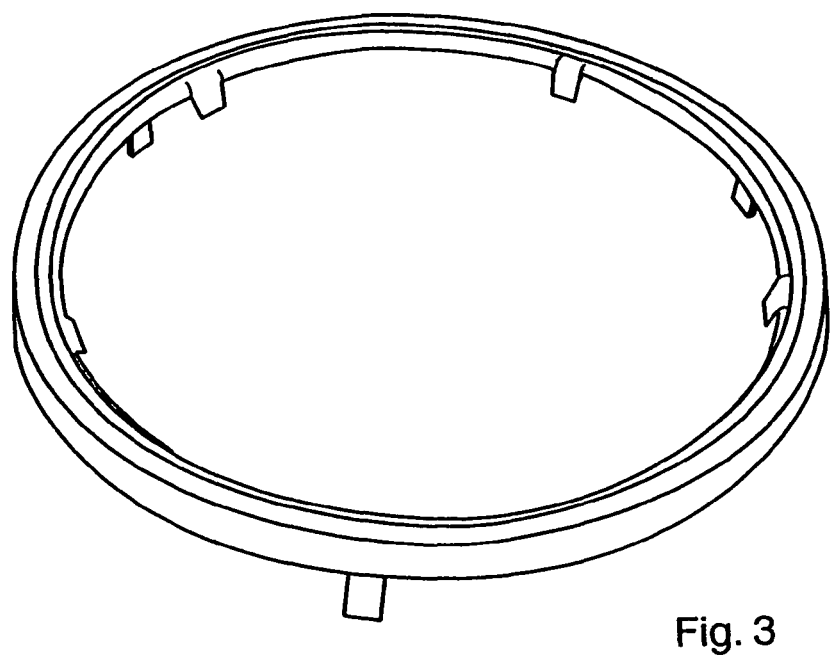
Fig. 3

DECORATIVE ELEMENT, DASHBOARD, AND METHOD FOR MANUFACTURING A DECORATIVE ELEMENT

CROSS REFERENCE TO RELATED APPLICATIONS

This application claims priority from and the benefit of PCT Application No. PCT/EP2010/006709, filed on Nov. 4, 2010 and German Patent No. DE 10 2010 005 496.8, filed on Jan. 23, 2010; both entitled "Decorative Element, Dashboard, and Method for Manufacturing a Decorative Element", which are herein incorporated by reference.

BACKGROUND

The present invention relates to a decorative element, a dashboard, notably for a motor vehicle, and a method for manufacturing a decorative element.

Decorative elements are known, notably for dashboards and in particular for motor vehicles.

Moreover, it is known practice to provide a chromium plating on an element intended to be attached to a vehicle, notably a motor vehicle. Such an element is—for example—known from the publication U.S. Pat. No. 6,279,974 B1.

Such an element provided for a chromium plating provides for the part to be chrome plated to be first of all manufactured, for the chrome plating step then to be performed, and, during a subsequent step, for such a chrome-plated part to be attached to a non-chrome-plated part.

The consequence of such a manufacturing method is that assembly tolerances may have a negative effect on the esthetic appearance of such a decorative element.

SUMMARY

The aim of the present invention is notably to overcome the drawbacks of the prior art, and notably those cited above, and also to propose a decorative element and a dashboard of a vehicle which can be produced simply and efficiently and which has an advantageous esthetic appearance.

According to the invention, this aim is achieved by a decorative element, notably for use associated with a dashboard of a motor vehicle, the decorative element comprising a first part and a second part, the first part of the decorative element being made of a first non-transparent material, the first material bearing a decoration layer, the second part of the decorative element being made of a second transparent or diffusing material (allowing for the passage of light), the first part of the decorative element and the second part of the decorative element being produced in a single piece.

Through such a production of the decorative element, it is advantageously possible to reduce or eliminate the assembly tolerances between the first part of the decorative element and the second part of the decorative element. This makes it possible to enhance the esthetic appearance of the decorative element, notably when the second part of the decorative element is illuminated.

A preferred refinement of the invention lies in the fact that the first part of the decorative element and the second part of the decorative element are produced via a two-stage injection molding.

According to a preferred embodiment of the decorative element according to the present invention, the first part of the decorative element and the second part of the decorative element are produced via a two-component injection molding.

Through such productions of the inventive decorative element, it is advantageously possible to minimize the efforts in manufacturing the decorative element and to minimize the assembly tolerances.

A preferred refinement of the invention lies in the fact that the first material comprises
  polyamide (PA), and/or
  acrylonitrile butadiene styrene (ABS), and/or
  polycarbonate+acrylonitrile butadiene styrene (PC-ABS), and/or
  polycarbonate (PC),
or a composition of these materials.

Through such a production of the inventive dashboard, it is advantageously possible to make the first part of the decorative element capable of being covered by a decoration layer, notably a layer of chromium.

According to a preferred embodiment of the decorative element according to the present invention, the second material comprises polymethyl methacrylate (PMMA) or polycarbonate (PC) as transparency or diffusing variant.

Through such a production of the inventive dashboard, it is advantageously possible to provide the second part of the decorative element such that the second part is not covered by the decoration layer.

A preferred refinement of the invention lies in the fact that the decoration layer is a layer of chromium.

According to a preferred embodiment of the decorative element according to the present invention, the first material is chosen to be easily covered by the decoration layer in a decoration layer application process (galvanoplasty type) and the second material is chosen such that, in the decoration layer application process, the second material is not covered by the decoration layer.

The present invention also relates to a motor vehicle dashboard comprising at least one inventive decorative element.

Through such an embodiment of the display method, it is advantageously possible to increase the level of safety of a vehicle because the user can concentrate on the important information and is not distracted from the main information by a multitude of information presented and/or by different positions of the information.

A preferred refinement of the invention lies in the fact that the dashboard comprises a display means, the display means having a display area, and the display area being at least partially surrounded by the decorative element.

Through such an embodiment of the display method, it is advantageously possible to produce a display that has an advantageous esthetic appearance.

The present invention also relates to a method for manufacturing an inventive decorative element, the method comprising the following steps:
  in a first step of the method, the first part and the second part are produced via a two-stage injection molding or via a two-component injection molding, and
  in a second step of the method, the decoration layer is applied selectively onto a surface of the first part.

Other features and advantages of the invention will become apparent from reading the following description of a particular nonlimiting embodiment of the invention.

DRAWINGS

The invention will be better understood from the following description, which relates to preferred embodiments, given as nonlimiting examples, and explained with reference to the appended schematic drawings in which:

FIG. 1 is a schematic sectional view of a decorative element according to a first variant of the present invention, FIG. 2 is a schematic sectional view of a decorative element according to a second variant of the present invention, FIG. 3 is a perspective view of a decorative element according to the present invention, and FIG. 4 is a schematic view of a display device of a dashboard according to the present invention.

DETAILED DESCRIPTION

As FIG. 4 of the appended drawing shows, a display device 10 according to the present invention comprises a display surface 11, notably in dial form. FIG. 4 of the drawing shows the display device 10 as a user of the display device 10 sees it, notably as a driver of the vehicle in which the display device 10 is mounted. It is possible according to the present invention for a needle 20 to be provided to display—for example—a quantity such as the speed of the vehicle or the number of revolutions of the engine of the vehicle.

In the example shown in FIG. 4, the display device 10 forms part of a dashboard of the vehicle and the display surface 11 of the display device 10 is encircled or surrounded by a decorative element 1, the decorative element 1 comprising a first part 2 and a second part 3.

FIGS. 1 and 2 show a schematic sectional view of the decorative element 1 according to a first variant (FIG. 1) of the present invention and according to a second variant (FIG. 2) of the present invention. As described, the decorative element 1 comprises a first part 2 of the decorative element 1 and a second part 3 of the decorative element 1.

The first part 2 of the decorative element 1 comprises a first material and the second part of the decorative element 1 comprises a second material. The first material is different from the second material in terms of its physical and/or chemical properties.

For example, the first material comprises
  polyamide (PA), and/or
  acrylonitrile butadiene styrene (ABS), and/or
  polycarbonate+acrylonitrile butadiene styrene (PC-ABS), and/or
  polycarbonate (PC),
or a composition of these materials.

It is also possible for the first material to comprise a composition of a number of these materials.

For example, the second material comprises polymethyl methacrylate (PMMA) or polycarbonate (PC) as transparency or diffusing variant.

The first material is preferably a material that has a high susceptibility for a decoration layer 5 (indicated in FIG. 1 with a dotted line), notably a layer of chromium. In the illustrated embodiment, the decoration layer 5 is deposited on an outer surface of the first part.

The second material is preferably a material on which a decoration layer does not hold, that is to say, when the decorative element 1 (before being subjected to the decoration layer application process) is treated so as to produce the decoration layer, the decoration layer is not deposited on a surface of the second part (or the second material) of the decorative element 1.

In FIG. 2, the first part 2 comprises a so-called foot part 4 which can be used—for example—to hold the decorative element 1 in the decoration layer application step, notably a chrome-plating process.

In all the variants of the present invention, the second material is preferably a material which is transparent. Moreover, according to the present invention, it is possible (and represented in FIGS. 1 and 2) for the first part 2 to be located more outside the second part 3 when the decorative element 1 is curved, and notably roundly shaped. Obviously, it is also possible for the second part 3 to be located more outside the first part 2 when the decorative element 1 is curved.

It is preferred for the two parts 2, 3 of the decorative element 1 to be produced via a two-stage injection molding or via a two-component injection molding. It is also possible for the decorative element to be produced via an injection molding with three (or more) stages or via an injection molding with three (or more) components.

FIG. 3 shows the decorative element 1 in a perspective representation.

The invention claimed is:

1. A motor vehicle dashboard comprising at least one decorative element for use with a display device, the at least one decorative element comprising a first part and a second part, the first part of the at least one decorative element comprising a first non-transparent material, the first material being at least partially covered by a decoration layer, wherein the decoration layer comprises chromium, the second part of the at least one decorative element comprises a second transparent material, the first part of the at least one decorative element and the second part of the at least one decorative element are a single piece, at least a portion of the decoration layer is disposed onto a surface of the first part facing away from the second part, the display device includes a display area, and the at least one decorative element at least partially surrounds the display area of the display device.

2. The motor vehicle dashboard as claimed in claim 1, wherein the first part of the at least one decorative element and the second part of the at least one decorative element are produced via a two-stage injection molding.

3. The motor vehicle dashboard as claimed in claim 1, wherein the first part of the at least one decorative element and the second part of the at least one decorative element are produced via a two-component injection molding.

4. The motor vehicle dashboard as claimed in claim 1, wherein the first material comprises polyamide (PA), and/or acrylonitrile butadiene styrene (ABS), and/or polycarbonate+acrylonitrile butadiene styrene (PC-ABS), and/or polycarbonate (PC), or a composition of these materials.

5. The motor vehicle dashboard as claimed in claim 1, wherein the second material comprises polymethyl methacrylate (PMMA) or polycarbonate (PC) as transparency or diffusing variant.

6. The motor vehicle dashboard as claimed in claim 1, wherein the first material is chosen to be easily covered by the decoration layer in a decoration layer application process, and the second material is chosen such that, in the decoration layer application process, the second material is not covered by the decoration layer.

7. A motor vehicle dashboard comprising at least one decorative element for use with a display device, the at least one decorative element comprising a first part and a second part, the first part of the at least one decorative element comprising a first non-transparent material, the first material being at least partially covered by a decoration layer, wherein the decoration layer comprises chromium, the second part of the at least one decorative element comprises a second transparent material, the first part of the at least one decorative element and the second part of the at least one decorative element are a single piece, at least a portion of the decoration layer is not disposed between the first part and the second part, the display device includes a display area, and the at least one decorative element at least partially surrounds the display area of the display device.

8. A motor vehicle dashboard comprising at least one decorative element for use with a display device, the at least one decorative element comprising a first part and a second part, the first part of the at least one decorative element comprising a first non-transparent material, the first material being at least partially covered by a decoration layer, wherein the decoration layer comprises chromium, the second part of the at least one decorative element comprises a second transparent material, the first part of the at least one decorative element and the second part of the at least one decorative element are a single piece, the second part is disposed against an inner surface of the first part, the decoration layer is disposed onto an outer surface of the first part, opposite the inner surface, the display device includes a display area, and the at least one decorative element at least partially surrounds the display area of the display device.

* * * * *